US009473188B2

(12) United States Patent
Corretjer et al.

(10) Patent No.: US 9,473,188 B2
(45) Date of Patent: Oct. 18, 2016

(54) METHOD AND APPARATUS FOR OPERATING A PORTABLE RADIO COMMUNICATION DEVICE IN A DUAL-WATCH MODE

(71) Applicant: MOTOROLA SOLUTIONS, INC, Schaumburg, IL (US)

(72) Inventors: Jesus F Corretjer, Weston, FL (US); Mohd Syazani B Abdul Aziz, Plantation, FL (US); Charles H Carter, Sunrise, FL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 118 days.

(21) Appl. No.: 13/898,944

(22) Filed: May 21, 2013

(65) Prior Publication Data

US 2014/0349588 A1 Nov. 27, 2014

(51) Int. Cl.
*H04B 7/00* (2006.01)
*H04B 1/3827* (2015.01)
*H04B 1/401* (2015.01)
*H04M 1/725* (2006.01)
*G06F 3/01* (2006.01)
*G06F 3/0346* (2013.01)
*H04W 84/08* (2009.01)

(52) U.S. Cl.
CPC ............ *H04B 1/3833* (2013.01); *G06F 3/017* (2013.01); *G06F 3/0346* (2013.01); *H04B 1/401* (2013.01); *H04M 1/72569* (2013.01); *H04M 2250/12* (2013.01); *H04W 84/08* (2013.01)

(58) Field of Classification Search
None
See application file for complete search history.

(56) References Cited

U.S. PATENT DOCUMENTS

| 5,758,267 A * | 5/1998 | Pinder | H04B 1/401 |
| | | | 341/20 |
| 6,289,207 B1 | 9/2001 | Hudecek et al. | |
| 8,243,961 B1 | 8/2012 | Morrill | |
| 8,290,545 B2 | 10/2012 | Terlizzi | |
| 2004/0190483 A1* | 9/2004 | Shahaf | H04W 84/08 |
| | | | 370/347 |
| 2008/0254822 A1 | 10/2008 | Tilley | |
| 2009/0239581 A1 | 9/2009 | Lee | |
| 2010/0203875 A1* | 8/2010 | Nishimori | H04L 65/4061 |
| | | | 455/416 |
| 2010/0289756 A1 | 11/2010 | Anzures et al. | |
| 2012/0089948 A1 | 4/2012 | Lim et al. | |

(Continued)

FOREIGN PATENT DOCUMENTS

WO 2010117592 A2 10/2010

OTHER PUBLICATIONS

PCT International Search Report Dated Sep. 9, 2014 for Counterpart Application PCT/US2014/035230.

*Primary Examiner* — Fayyaz Alam
*Assistant Examiner* — Mohammed Rachedine
(74) *Attorney, Agent, or Firm* — Barbara R. Doutre

(57) ABSTRACT

A portable radio communication device is provided that receives communications on a primary channel and a secondary channel as part of a dual-watch mode of operation. The portable radio communication device detects a gesture associated with the portable radio communication device and identifies a channel from one of the primary channel and the secondary channel corresponding to the detected gesture. Further, the portable radio communication device associates controls of a user interface in the portable radio communication device to the identified channel for controlling one or more operational parameters pertaining to the identified channel during the dual-watch mode of operation.

19 Claims, 6 Drawing Sheets

(56) References Cited

U.S. PATENT DOCUMENTS

| | | |
|---|---|---|
| 2012/0127012 A1 | 5/2012 | Gicklhorn et al. |
| 2012/0127069 A1* | 5/2012 | Santhiveeran ........ G06F 1/1686 345/156 |
| 2012/0183156 A1 | 7/2012 | Schlessinger et al. |
| 2012/0329529 A1* | 12/2012 | van der Raadt ...... G06F 1/1694 455/566 |
| 2013/0053054 A1* | 2/2013 | Lovitt ................... H04W 4/028 455/456.1 |
| 2013/0316687 A1* | 11/2013 | Subbaramoo ......... H04M 1/605 455/418 |

\* cited by examiner

METHOD AND APPARATUS FOR OPERATING A PORTABLE RADIO COMMUNICATION DEVICE IN A DUAL-WATCH MODE

FIELD OF THE DISCLOSURE

The present invention relates generally to operations of communication devices and more particularly to portable two-way radio communication devices operating during a dual-watch mode.

BACKGROUND

Portable radios such as hand-held two-way radios are utilized within a variety of public safety environments, such as law enforcement, fire rescue, and emergency medical environments to name a few. Currently, public safety personnel working in the field use two physical radios in order to monitor more than one channel at a time. Using two radios can be cumbersome, and managing the communications from two radios independently via each radio's user interface can be challenging, leading to potential confusion and loss of information.

Accordingly, there is a need for an improved means for managing multiple received communications.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

Figure 1:
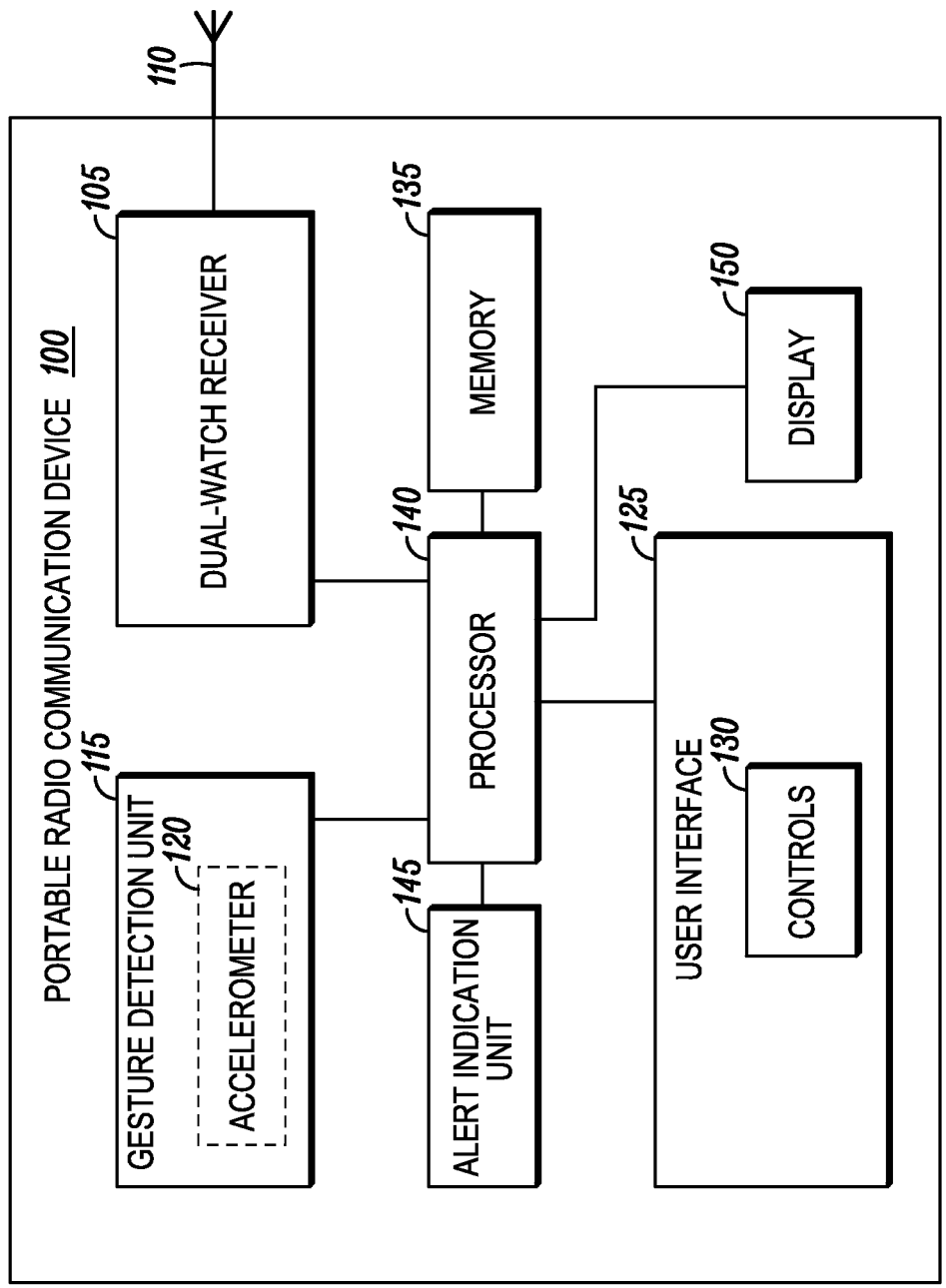
FIG. 1 is a block diagram of a portable radio communication device in accordance with the various embodiments of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Briefly, in accordance with the various embodiments, there is described herein, a method and apparatus for operating a portable radio communication device. The portable radio communication device receives communications on a primary channel and a secondary channel during a dual-watch mode of operation. The portable radio communication device detects a gesture associated with the portable radio communication device and identifies a channel from one of the primary channel and the secondary channel corresponding to the detected gesture. Further, the portable radio communication device associates controls of a user interface in the portable radio communication device to the identified channel for controlling one or more operational parameters pertaining to the identified channel during the dual-watch mode of operation.

FIG. 1 is a block diagram of a portable radio communication device 100 operating in accordance with various embodiments. The portable radio communication device 100 may be one of a handheld two-way radio, a remote speaker microphone (RSM) accessory coupled to the handheld two-way radio, a land mobile radio (LMR) having a handheld control head, or any communication device that is collaboratively coupled to a radio communication device operating during a dual-watch mode of operation.

In accordance with the various embodiments of the present disclosure, the portable radio communication device 100 operates in a dual-watch mode in which the portable radio communication device 100 simultaneously monitors (and plays) received communications over a primary channel and a secondary channel. The portable radio communication device 100 comprises a dual-watch receiver 105 coupled to at least one antenna 110, a gesture detection unit 115 comprising an accelerometer 120, a user interface 125 comprising controls 130, a memory 135 storing operating and/or programming instructions, a processor 140 for executing the operating and/or programming instructions stored in the memory 135, an alert indication unit 145, and optionally, a display 150. Further, the portable radio communication device 100 includes a transmitter (not shown). Additionally, the portable radio communication device 100 includes one or more input/output interfaces such as keypad(s), speaker(s), and microphone(s).

The dual-watch receiver 105 of the portable radio communication device 100 is configured to receive radio frequency (RF) signals via the at least one antenna 110. In this regard, the dual-watch receiver 105 and the at least one antenna 110 include appropriate conventional circuitry to enable digital or analog communications over a wireless communication channel. Further, the at least one antenna 110 includes any known or developed structure for receiving electromagnetic energy in the RF spectrum. In accordance with various embodiments, the dual-watch receiver 105 is tuned into communications of both the primary channel and the secondary channel via the at least one antenna 110. The dual-watch receiver 105 simultaneously monitors wireless communications on both the primary channel and the secondary channel and routes received communications to one or more speakers on the portable radio communication device 100. In some embodiments, the dual-watch receiver 105 simultaneously monitors wireless communications on both the primary channel and the secondary channel using a single receiving antenna. In another embodiment, the dual-watch receiver 105 periodically toggles to monitor communications on both the primary channel and the secondary channel using a single receiving antenna. In some other embodiments, the dual-watch receiver 105 simultaneously monitors wireless communications on both the primary channel and the secondary channel using two antennas. In this aspect, each of the two antennas is tuned to monitor communications of the primary channel and the secondary channel respectively. Other antenna arrangements are also feasible.

The gesture detection unit 115 of the portable radio communication device 100 is configured to detect a gesture associated with the portable radio communication device 100. In some embodiments, the gesture detection unit 115 detects the gesture using an accelerometer 120. Alternately, the gesture detection unit 115 detects the gesture using a mercury switch and/or a gravity sensor. Further, the gesture detection unit 115 detects the gesture when the readings of the accelerometer 120 exceed a predefined value. In one embodiment, the gesture detection unit 115 is configured to detect a vertical or a horizontal orientation of the portable radio communication device 100. In another embodiment, the gesture detection unit 115 is configured to detect a direction of orientation of the portable radio communication device 100. The detected direction of orientation may be one of a left orientation and a right orientation relative to a reference point. Further, in another embodiment, the gesture detection unit is configured to detect a pre-defined motion and/or a direction of the pre-defined motion associated with the portable radio communication device 100. Further, in another embodiment, the gesture detection unit 115 is configured to detect one or more or of an orientation, a direction of orientation, a predefined motion, and/or a direction of a predefined motion associated with the portable radio communication device 100.

The user interface 125 of the portable radio communication device comprises controls 130 which allow user control of operational parameters. The operational parameters are parameters that relate to radio communication. The operational parameters may comprise one or more of a volume parameter, an encryption on/off parameter, a push-to-talk call placing parameter to name a few. In accordance with some embodiments, the user interface 125 is a volume interface comprising a volume knob or a volume button. The volume interface allows the user to control volume of communications at the portable radio communication device 100. In accordance with some other embodiments, the user interface 125 is an encryption on/off interface that allows the user to enable/disable encryption of communication at the portable radio communication device 100. Further, in accordance with some other embodiments, the user interface 125 is a push-to-talk (PTT) call press interface that allows the user to control transmit PTT communication during on-going communication(s) at the portable radio communication device 100.

The memory 135 of the portable radio communication device 100 stores operational and programming instructions. The memory 135 can be an integrated-circuit (IC) memory chip containing any form of random-access memory (RAM), a floppy disk, a compact disk with read write (CD-RW), a hard disk drive, a digital versatile disc with read write (DVD-RW), a flash memory card, external subscriber identity module (SIM) card or any other medium for storing digital information. In accordance with various embodiments, memory 135 is configured to store list of possible gestures that are associated with the portable radio communication device 100. The memory also stores a look-up table listing each of the possible gestures that is mapped to either one of or both the primary channel and the secondary channel. The look-up table is utilized by the processor 140 during identification of a channel from the primary channel and the secondary channel based on a gesture detected by the gesture detection unit 115.

The processor 140 of the portable radio communication device 100 may include one or more microprocessors, microcontrollers, DSPs (digital signal processors), state machines, logic circuitry, or any other device or devices that process information based on operational or programming instructions stored in the memory 135.

In accordance with the various embodiments, the processor 140 is configured to identify a channel from one of the primary channel and the secondary channel based on a detected gesture by the gesture detection unit 115. Subsequently, the processor 140 is further configured to associate controls 130 of the user interface 125 to the identified channel to allow the user of the portable radio communication device 100 to control one or more operational parameters pertaining to communications over the identified channel during the dual-watch mode of operation. For example, when the portable radio communication device is oriented in a left direction, the processor associates controls of the volume interface, the encryption on/off interface, and/or the PTT call press interface to the secondary channel to allow the user to control volume, encryption and/or talk back option only for communications over the secondary channel. Consequently, when the user increases volume on the portable radio communication device 100, only the volume of received communications on the secondary channel is increased. Thus, in accordance with the various embodiments, the processor 140 changes the focus of the controls 130 of the user interface 125 in accordance with the detected gesture.

The alert indication unit 145 of the portable radio communication device 100 comprises one or more of a light emitting diode (LED) and a speaker. The alert indication unit 145 is configured to present an alert to the user of the portable radio communication device 100 when the processor 140 identifies the channel corresponding to the detected gesture from one of the primary channel and the secondary channel. In one instance, the alert is presented to the user in the form an audio beep. In another instance, the alert is presented to the user in the form of a blinking LED from a plurality of LEDs present on the portable radio communication device 100. Other visual or audible alerts may be generated by the alert indication unit 145 as pre-programmed in the portable radio communication device 100.

In accordance with the various embodiments, the display 150 of the portable radio communication device 100 is configured to visually present various operational characteristics of the portable radio communication device 100 to a user. Display 150 can visually present talk-group IDs of talk-groups associated with the primary and the secondary channel. Display 150 may also present a status of communications on the primary channel and the secondary channel. During the dual-watch mode of operation, the display is configured to indicate communications of which channel out of the primary channel and the secondary channel is being played at one or more speakers on the portable radio communication device 100. In accordance with some embodiments, a graphical user interface (GUI) of the display 150 may associate with the identified channel to present information relating to the operational characteristics of the identified channel. Such operational characteristics may comprise one or more of status, channel information, talk group IDs, signal strength indication, channel frequency, and encryption on/off setting of the identified channel.

Figure 2:
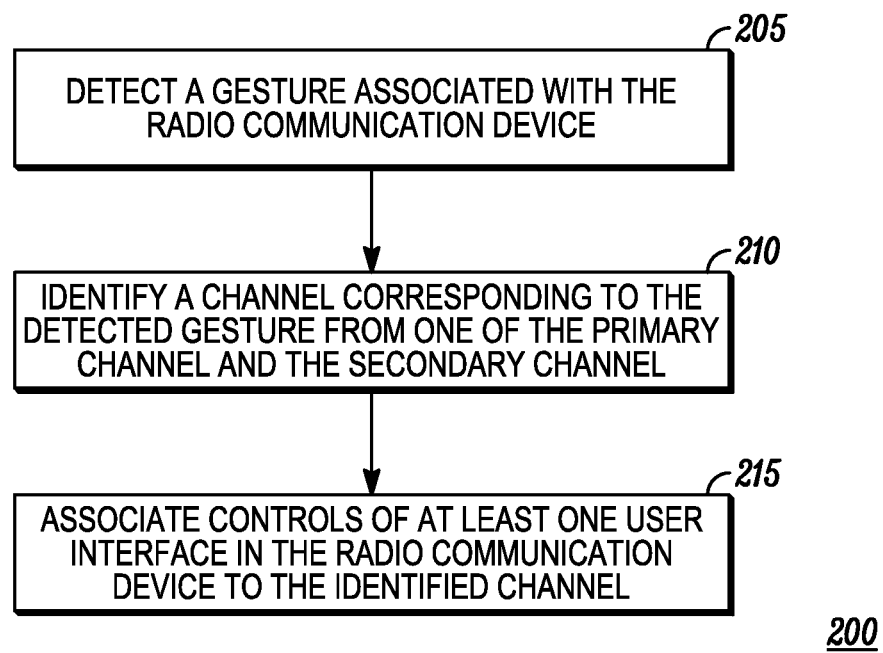
FIG. 2 is a flowchart illustrating a method for operating the portable radio communication device in accordance with the various embodiments of the present disclosure.

FIG. 2 is a flowchart 200 illustrating a method for operating the portable radio communication device 100 in accordance with the various embodiments. At 205, the portable radio communication device 100 detects a gesture associated with the portable radio communication device 100 when operating in the dual-watch mode of operation. At 210, the portable radio communication device 100 identifies a channel corresponding to the detected gesture from one of the primary channel and the secondary channel. The portable radio communication device 100 may refer to the look-up table to identify the channel from the primary channel and the secondary channel corresponding to the detected gesture. At 215, the portable radio communication device 100 associates controls 130 of the user interface 125 to the identified channel. In some embodiments, the portable radio communication device 100 changes focus of the controls 130 of the user interface 125 from operational parameters of a default channel(s) to operational parameters of the secondary channel when the secondary channel is identified. Herein, in one instance, the default channel(s) is a pre-defined or a preconfigured channel out of the primary channel and the secondary channel. In another instance, the default channel(s) is the primary channel. Further, in another instance, the default channel(s) include both the primary channel and the secondary channel.

Figure 3:
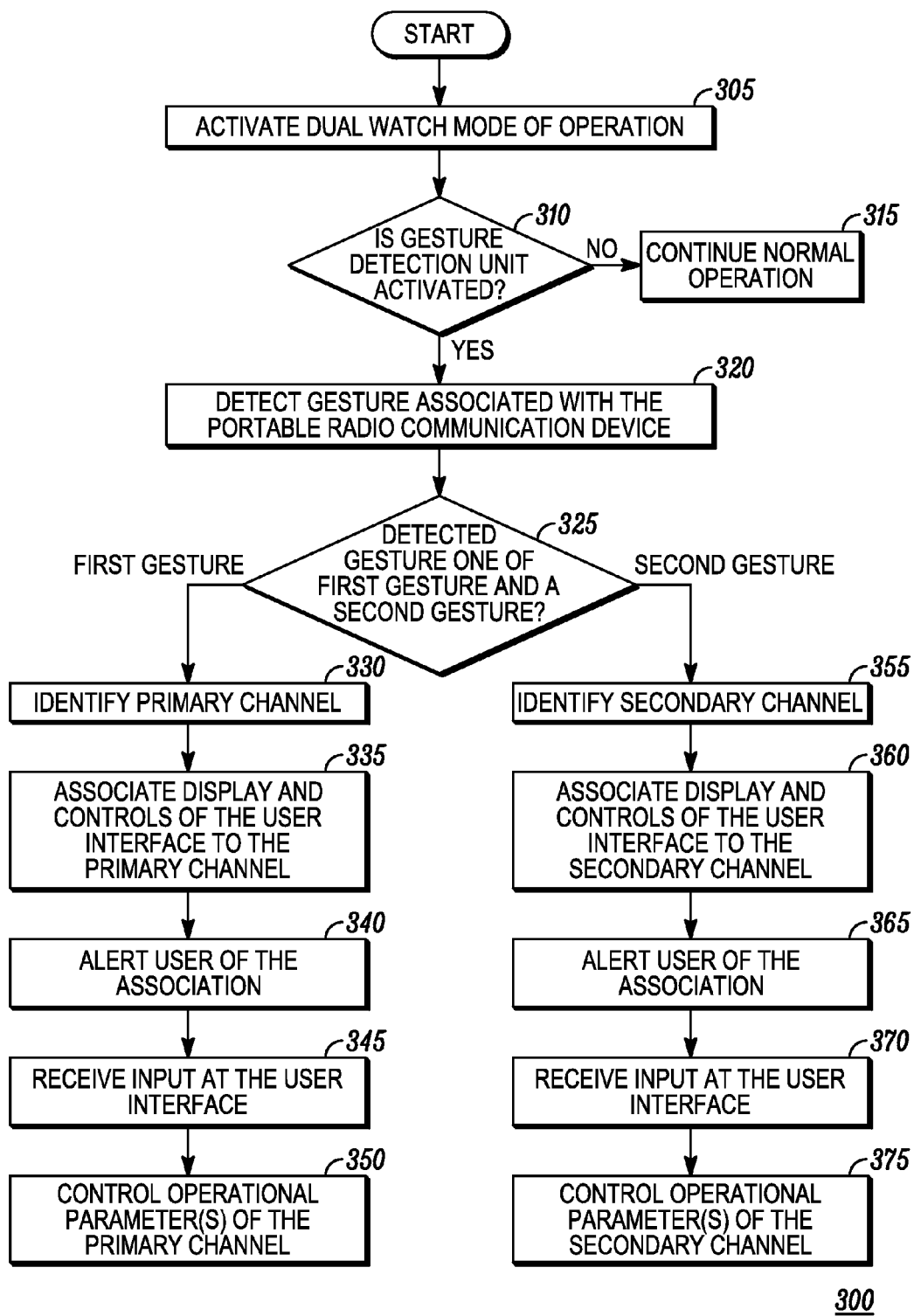
FIG. 3 is a detailed flowchart illustrating a method for operating the portable radio communication device in accordance with the various embodiments of the present disclosure.

FIG. 3 is a detailed flowchart illustrating a method for operating the portable radio communication device in accordance with the various embodiments of the present disclosure. At 305, the dual-watch mode of operation of the portable radio communication device is activated. During the dual-watch mode of operation, the portable radio communication device monitors (and plays) received communications over both the primary and the secondary channel. In some embodiments, during normal operation of the dual-watch mode of operation, a user of the portable radio communication device is able to control operational parameters of communications of a default channel(s). For example, the user may have predefined the primary channel as the default channel via user programming. Alternatively, the portable radio communication device 100 may be programmed to have the primary channel as the default channel.

At 310, it is checked whether the gesture detection unit is activated. The gesture detection unit is activated by a user via an input at the portable radio communication device. Alternately, the gesture detection unit is pre-activated during manufacture of the portable radio communication device and the user may deactivate it via an input at the portable radio communication device. When the gesture detection unit is activated, the method proceeds to 320. In case the gesture detection unit is not activated, the portable radio communication device continues normal operation at 315.

At 320, a gesture associated with the portable radio communication device is detected. The gesture includes one or more of an orientation of the portable radio communication device, a direction of orientation of the portable radio communication device, a predefined motion associated with the portable radio communication device, and/or a predefined direction of motion associated with the portable radio communication device. At 325, it is determined whether the detected gesture is one of a first gesture and a second gesture. If the detected gesture is the first gesture, the method proceeds to 330. If the detected gesture is the second gesture, the method proceeds to 355.

At 330, when the detected gesture is the first gesture, the primary channel is identified. The controls of the user interface and/or the display are then associated to the communications of the primary channel at 335. Optionally, the association is presented to the user of the portable radio communication device at 340. In some embodiments, the association is presented to the user of the portable radio communication device via an audio beep and/or an LED. Additionally, the association is visually presented to the user on the display. In this case, the status, channel information, and talk-group ID associated with the primary channel is displayed. Subsequently at 345, whenever a user input is received at the user interface, the operational parameters (such as volume, encryption on/off) are controlled at 350 for communications over the primary channel in accordance with the received input.

Returning to 325, if the detected gesture is the second gesture, the method proceeds to 355. At 355, the secondary channel is identified. The controls of the user interface and/or the display are then associated to the communications of the secondary channel at 360. Optionally, the association is presented to the user of the portable radio communication device at 365. In some embodiments, the association is presented to the user of the portable radio communication device via an audio beep and/or an LED. Additionally, the association is visually presented to the user on the display. In this case, the status, channel information, and talk-group ID associated with the secondary channel is only displayed. Subsequently at 370, whenever an input is received at the user interface from the user, the operational parameters (such as volume, encryption on/off) are controlled at 375 for communications over the secondary channel in accordance with the received input.

Figure 4:
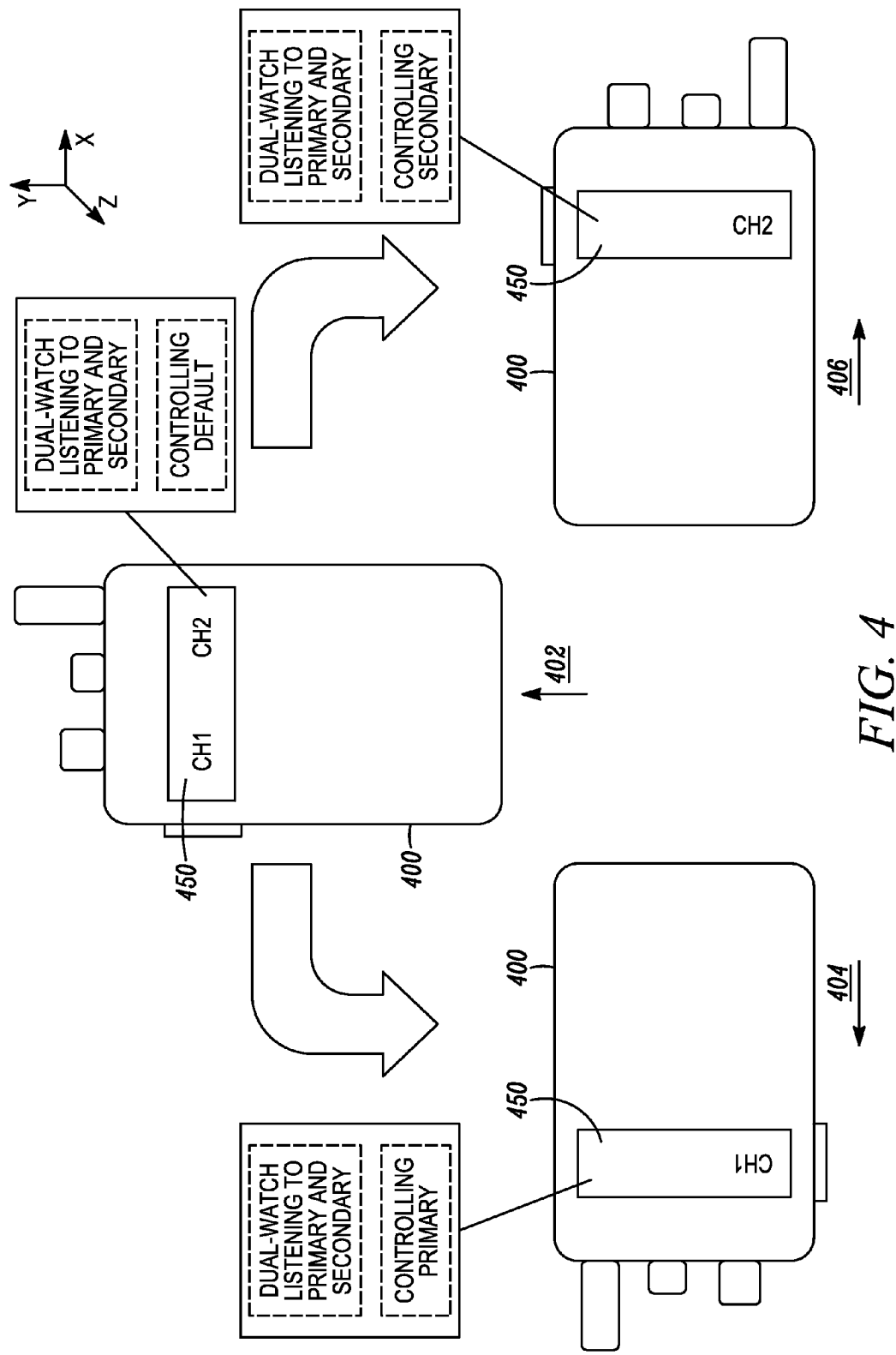
FIG. 4 illustrates the portable radio communication device implemented as a handheld two-way radio to demonstrate an example of dual-watch operation in accordance with the various embodiments of the present disclosure.

FIG. 4 illustrates the portable radio communication device 100 of FIG. 1 implemented as a handheld two-way radio 400 to demonstrate an example of dual-watch operation in accordance with the various embodiments of the present disclosure. FIG. 4 illustrates a front view of the handheld two-way radio 400. In FIG. 4, three orientations of the handheld two-way radio 400, namely, a vertical orientation 402, a horizontal left orientation 404, and a horizontal right orientation 406, and the operation of the handheld two-way radio 400 corresponding to the three orientations are shown. During normal operation, the handheld two-way radio 400 is oriented in the vertical orientation 402. In this orientation, the handheld two-way radio 400 listens to received communications on the primary and the secondary channel during the dual-watch mode of operation. Further, in this orientation, the display 450 and controls of the user interfaces are associated with a default channel(s). In one instance, the default channel(s) includes both of the primary and the secondary channel. In this case, a user input at controls of one or more interfaces affects operational parameters of both the primary channel and the secondary channel. For example, a user input at the increase volume switch (or knob) at the handheld two-way radio 400 increases volume of communications over both the primary channel and the secondary channel. In another instance, the default channel for control is a predefined or a preconfigured channel out of the primary channel and the secondary channel. In this case, the user is only able to control operational parameters of that predefined (or preconfigured) channel during normal operation.

When the handheld two-way radio 400 is rotated counterclockwise from the vertical orientation 402 to the horizontal left orientation in 404 (or when the handheld two-way radio 400 is rotated from the horizontal right orientation 406 to the horizontal left orientation in 404), the handheld two-way radio 400 identifies the primary channel and associates the display 450 and the controls of one or more user interface to the communications of the primary channel. In the horizontal left orientation 404, the handheld two-way radio 400 listens to received communications on both the primary and the secondary channel during the dual-watch mode of operation but allows the user to focus on communications of the primary channel. In this orientation, a user input at controls of one or more interfaces only affects operational parameters of the primary channel. For example, a user input at the increase volume switch (or knob) at the handheld two-way radio 400 increases volume of communications over only the primary channel. In another example, the user input at the encryption ON switch at the handheld two-way radio 400 enables encryption of communications only over the primary channel. Further, in another example, a press of the PTT call button at the handheld two-way radio 400 allows a user to control transmissions over a talk back channel associated with the primary channel. Hence, in the horizontal left orientation 404, the focus of the controls of the user interface of the handheld two-way radio 400 is switched to the primary channel.

When the handheld two-way radio 400 is rotated counterclockwise from the horizontal left orientation 404 to a horizontal right orientation 406 (or when the handheld two-way radio 400 is rotated from the vertical orientation 402 to the horizontal right orientation 406), the handheld two-way radio 400 identifies the secondary channel and associates the display and the controls of one or more user interface to the communications of the secondary channel. In the horizontal right orientation 406, the handheld two-way radio listens to received communications on both the primary and the secondary channel during the dual-watch mode of operation but allows the user to focus on communications of the secondary channel. In this orientation, a user input at controls of one or more interfaces only affects operational parameters of the secondary channel. For example, a user input at the increase volume switch (or knob) at the handheld two-way radio 400 increases volume of communications over only the secondary channel. In another example, the user input at the encryption ON switch at the handheld two-way radio 400 enables encryption of communications only over the secondary channel. Further, in another example, a press of the PTT call button at the handheld two-way radio 400 allows a user to transmit over a talk back channel associated with the secondary channel. Hence, in the horizontal right orientation 406, the focus of the controls of the user interface of the handheld two-way radio 400 is switched to the secondary channel.

Figure 5:
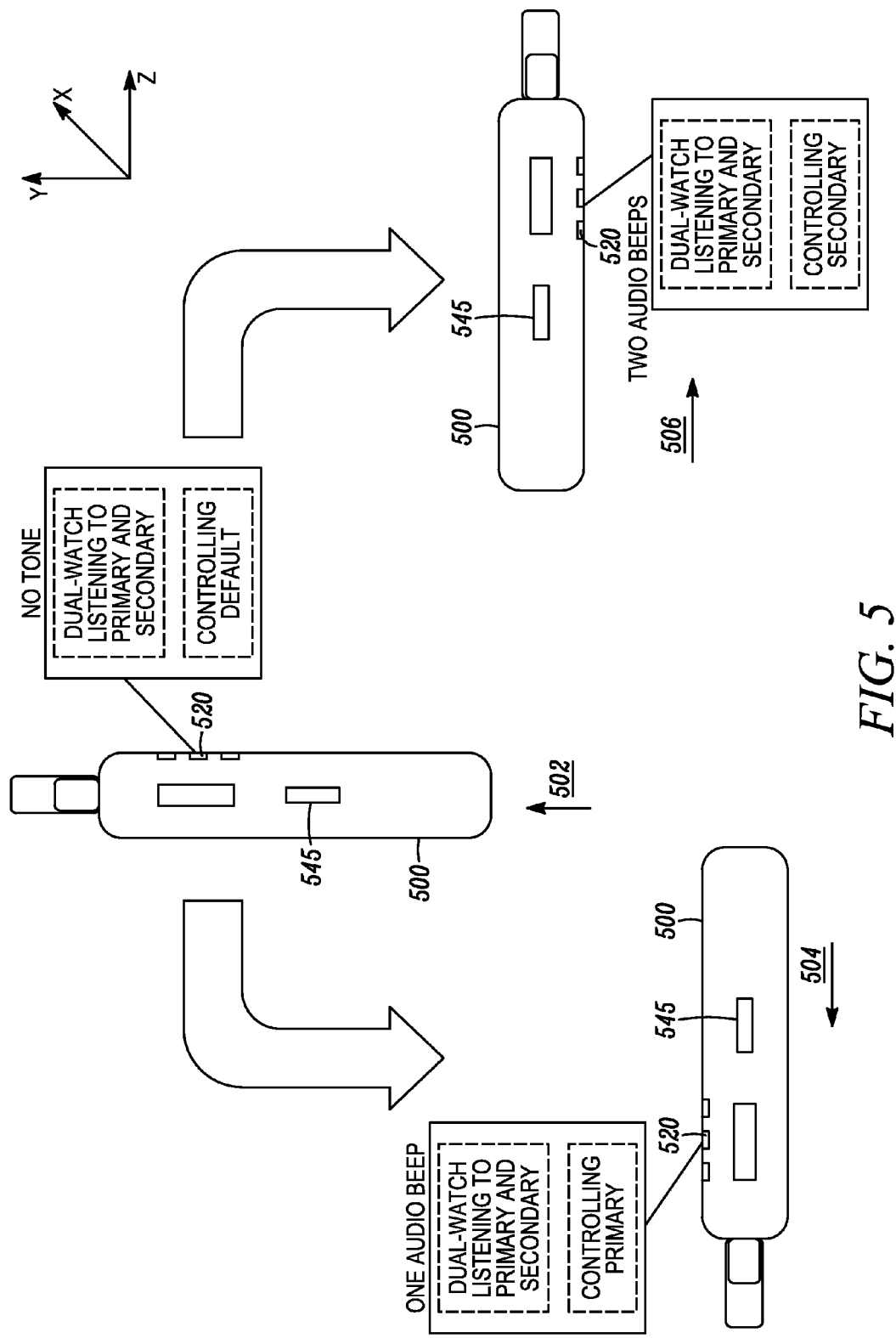
FIG. 5 illustrates the portable radio communication device implemented as a handheld two-way radio to demonstrate another example of dual-watch operation in accordance with the various embodiments of the present disclosure.

FIG. 5 illustrates the portable radio communication device 100 of FIG. 1 implemented as a handheld two-way radio 500 to demonstrate another example of dual-watch operation in accordance with the various embodiments of the present disclosure. FIG. 5 illustrates a side view of the handheld two-way radio 500. In FIG. 5, three orientations of the handheld two-way radio 500, namely, a vertical orientation 502, a first horizontal orientation 504, and a second horizontal orientation 506, and the operation of the handheld two-way radio 500 corresponding to the three orientations are shown. During normal operation, the handheld two-way radio 500 is oriented in the vertical orientation 502. In this orientation, the handheld two-way radio 500 listens to received communications on the primary and the secondary channel during the dual-watch mode of operation. Further, in this orientation, controls of the user interfaces are associated with a default channel(s). In one instance, the default channel(s) includes both of the primary and the secondary channel. In this case, a user input at controls of one or more interfaces affects operational parameters of both the primary channel and the secondary channel. For example, a user input at the increase volume switch (or knob) at the handheld two-way radio 500 increases volume of communications over both the primary channel and the secondary channel. In another instance, the default channel for control is a predefined or a preconfigured channel out of the primary channel and the secondary channel. In this case, the user is only able to control operational parameters of that predefined (or preconfigured) channel during normal operation.

When the handheld two-way radio 500 is rotated to the first horizontal orientation in 504, the handheld two-way radio 500 identifies the primary channel, associates the controls of one or more user interface to the communications of the primary channel, and alerts a user of the association via an audio beep via speaker 545. In the first horizontal orientation 504, the handheld two-way radio 500 listens to received communications on both the primary and the secondary channel during the dual-watch mode of operation but allows the user to focus on communications of the primary channel. In this orientation, a user input at controls of one or more interfaces only affects operational parameters of the primary channel. For example, a user input at the increase volume switch (or knob) at the handheld two-way radio 500 increases volume of communications over only the primary channel. In another example, the user input at the encryption ON switch at the handheld two-way radio 500 enables encryption of communications only over the primary channel. Further, in another example, a press of the PTT call button at the handheld two-way radio 500 allows the user to transmit over a talk back channel associated with the primary channel. Hence, in the first horizontal orientation 504, the focus of the controls of the user interface of the handheld two-way radio 500 is switched to the primary channel.

When the handheld two-way radio 500 is rotated to the second horizontal orientation 606, the handheld two-way radio 500 identifies the secondary channel, associates the controls of one or more user interface to the communications of the secondary channel, and alerts a user of the association via two audio beeps via speaker 545. In the second horizontal orientation 506, the handheld two-way radio listens to received communications on both the primary and the secondary channel during the dual-watch mode of operation but allows the user to focus on communications of the secondary channel. In this orientation, a user input at controls of one or more interfaces only affects operational parameters of the secondary channel. For example, a user input at the increase volume switch (or knob) at the handheld two-way radio 500 increases volume of communications over only the secondary channel. In another example, the user input at the encryption ON switch at the handheld two-way radio 500 enables encryption of communications only over the secondary channel. Further, in another example, a press of the PTT call button at the handheld two-way radio 500 allows the user to transmit over a talk back channel associated with the secondary channel. Hence, in the second horizontal orientation 506, the focus of the controls of the user interface of the handheld two-way radio 500 is switched to the secondary channel.

Figure 6:
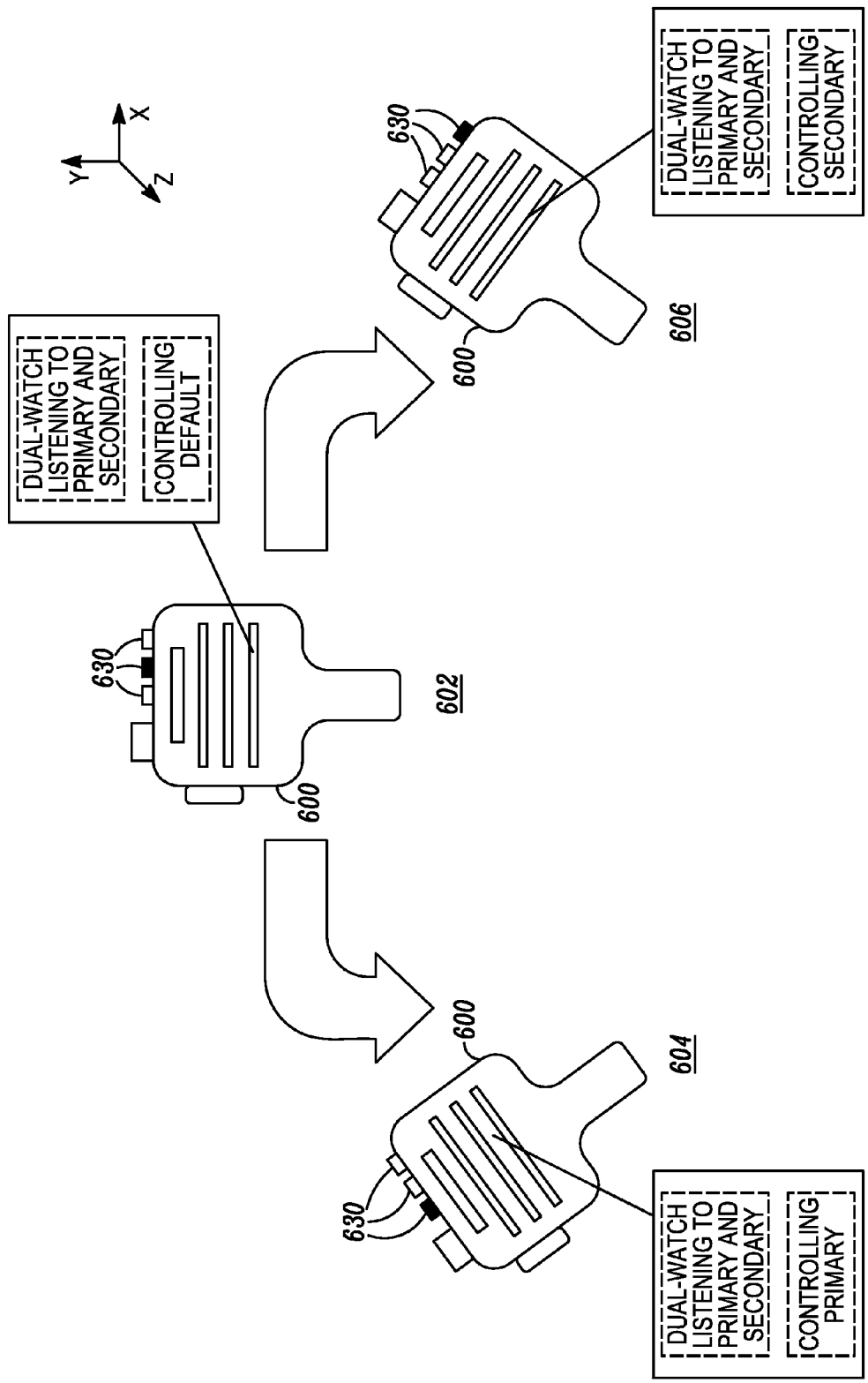
FIG. 6 illustrates the portable radio communication device implemented as a remote speaker microphone accessory to demonstrate a yet another example of dual-watch operation in accordance with the various embodiments of the present disclosure.

FIG. 6 illustrates the portable radio communication device 100 of FIG. 1 implemented as a remote speaker microphone (RSM) accessory 600 to demonstrate a yet another example of dual-watch operation in accordance with the various embodiments of the present disclosure. In one embodiment, the RSM accessory 600 is communicatively coupled to the handheld two-way radio of FIG. 4 and FIG. 5. The RSM accessory 600 is coupled via a cable or is coupled wirelessly to the handheld two-way radio. In one instance, the RSM accessory 600 is clipped to a clothing (shoulder strap or lapel) worn by a user. In this embodiment, the RSM 600 comprises a plurality of LEDs, wherein each LED provides an indicator to the user and to a radio control mode.

In FIG. 6, three orientations of the RSM accessory 600, namely, a vertical orientation 602, a titled left orientation 604, and a tilted right orientation 606, and the operation of the RSM accessory 600 corresponding to the three orientations are shown. During normal operation, the RSM accessory 600 is oriented in a vertical orientation 602. In this orientation, the RSM accessory 600 receives communications on the primary and the secondary channel during the dual-watch mode of operation. This state is indicated to a user via glow of an LED of the plurality of LEDs 630. Further, in this orientation, controls of the user interfaces are associated with a default channel(s). In one instance, the default channel may be both of the primary and the secondary channel. In this case, a user input at controls of one or more interfaces affects operational parameters of both the primary channel and the secondary channel. For example, a user input at the increase volume switch (or knob) at the RSM accessory 600 increases volume of communications over both the primary channel and the secondary channel. In another instance, the default channel for control is a predefined or a preconfigured channel of the primary channel and the secondary channel. In such instance, the user may only be able control operational parameters of that predefined (or preconfigured) channel during normal operation.

When the RSM accessory 600 is tilted counterclockwise from the vertical orientation 602 to the tilted left orientation 604 (or when the RSM accessory 600 is tilted from the tilted right orientation 606 to the tilted left orientation 604), the RSM accessory 600 identifies the primary channel and associates the controls of one or more user interface to the primary channel. This state is indicated another LED of the plurality of LEDs 630. In the tilted left orientation 604, the RSM accessory 600 receives communications on both the primary and the secondary channel during the dual-watch mode of operation but allows the user to concentrate on communications of the primary channel. In this orientation, a user input at controls of one or more interfaces only affects operational parameters of the primary channel. For example, a user input at the increase volume switch at the RSM accessory 600 increases volume of communications over only the primary channel. In another example, the user input at the encryption ON switch at the RSM accessory 600 enables encryption of communications only over the primary channel. Further, in another example, a press of the PTT call button at the RSM accessory 600 allows a user to transmit over a talk back channel associated with the primary channel. Hence, in the titled left orientation 604, the focus of the controls of the user interface of the RSM accessory 600 is switched to the primary channel.

When the RSM accessory 600 is tilted clockwise from the tilted left orientation 604 to a tilted right orientation 606 (or when the RSM accessory 600 is tilted from the vertical orientation 602 to the tilted right orientation 606), the RSM accessory 600 identifies the secondary channel and associates the controls of one or more user interface to the secondary channel. This is indicated to a user via glow of another LED of the plurality of LEDs 630. In the tilted right orientation 606, the RSM accessory 600 receives communications on both the primary and the secondary channel during the dual-watch mode of operation but allows the user to concentrate on communications of the secondary channel. In this orientation, a user input at controls of one or more interfaces only affects operational parameters of the secondary channel. For example, a user input at the increase volume switch (or knob) at the RSM accessory 600 increases volume of communications over only the secondary channel. In another example, the user input at the encryption ON switch at the RSM accessory 600 enables encryption of communications only over the secondary channel. Further, in another example, a press of the PTT call button at the RSM accessory 600 allows a user to transmit over a talk back channel associated with the secondary channel. Hence, in the titled right orientation 606, the focus of the controls of the user interface of the RSM accessory 600 is switched to the secondary channel.

While FIG. 6 is shown as a remote speaker microphone accessory 600, other collaborative accessory devices known or yet to be developed that operate, either wired or wirelessly with to a dual-watch capable device, can take advantage of the various embodiments of the invention. While the indicator in this embodiment shows the plurality of LEDs 630, it is understood that other LED arrangements, such as a blinking LED, colored LED(s), to name a few, could also be utilized. Additionally, the plurality of LEDs are shown merely as an example of many visual indicators (visual and/or audible) that can be provided to a user.

The present disclosure utilizes dual-watch capability of portable radio communication devices to mitigate the need for public safety officers to carry two devices for communicating with two different talk groups over two different channels simultaneously. Further, by associating controls of user interface(s) on the portable radio communication device to a single channel during dual-watch mode of operation, the present disclosure also allows the public safety officer to focus on communications of a single talk group while not missing out on received communications of another talk group, if and when the need arises. Also, a gesture controlled association allows the public safety office to intuitively control operational parameters of communications on the primary channel and the secondary channel simply by rotating the portable radio communication device.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method for operating a portable radio communication device, the method comprising, at the portable radio communication device:
   simultaneously receiving and processing communications, via a dual-watch receiver of the portable radio, on both a primary channel and a secondary channel during a dual-watch mode of operation;
   detecting a gesture at the portable radio communication device, wherein detecting the gesture associated with the portable radio communication device comprises one or more of:
      detecting an orientation of the portable radio communication device;
      detecting a direction of the orientation of the portable radio communication device; and
      detecting a direction of motion of the portable radio communication device;
   identifying that the detected gesture is associated with one of the simultaneously received primary or secondary channels;
   automatically associating controls of a user interface in the portable radio communication device to the identified channel for controlling one or more operational parameters pertaining to the communications received over the identified channel during the dual-watch mode of operation; and
   continuing to simultaneously receive and process communications on both channels during the dual-watch mode of operation, while controlling the parameters of the communications pertaining to the identified channel with the user interface.

2. The method of claim 1, further comprising:
   when the identified channel is the primary channel and when the controls of the user interface are associated with the secondary channel, changing focus of the controls of the user interface from operational parameters of the secondary channel to the operational parameters of the primary channel; and
   when the identified channel is the secondary channel and when the controls of the user interface are associated with the primary channel, changing focus of the controls of the user interface from operational parameters of the primary channel to the operational parameters of the secondary channel.

3. The method of claim 1, further comprising:
   in response to associating, receiving a user input at the controls of the user interface of the portable radio communication device; and
      controlling one or more operational parameters pertaining to the identified channel during the dual-watch mode of operation in accordance with the received input.

4. The method of claim 1, further comprising:
   detecting whether the gesture is one of a first gesture and a second gesture;
   when the detected gesture is the first gesture:
      identifying the channel as the primary channel, and
      associating controls of the user interface in the portable radio communication device to the primary channel for controlling one or more operational parameters pertaining to the primary channel during the dual-watch mode of operation; and
   when the detected gesture is the second gesture:
      identifying the channel as the secondary channel, and
      associating controls of the user interface in the portable radio communication device to the secondary channel for controlling one or more operational parameters pertaining to the secondary channel during the dual-watch mode of operation.

5. The method of claim 1, wherein the interface comprises one or more of a volume adjustment interface and an encryption on/off interface, and wherein the one or more operational parameters of the identified channel comprise one or more of a volume parameter and an encryption on/off parameter pertaining to the identified channel and wherein associating controls of the at least one user interface in the portable radio communication device to the identified channel for controlling one or more operational parameters pertaining to the identified channel comprises one or more of:
   associating controls of the volume adjustment interface to the identified channel for controlling volume of communications over the identified channel; and
   associating controls of the encryption on/off interface to the identified channel for enabling/disabling encryption over the identified channel.

6. The method of claim 1, further comprising presenting an alert to a user of the portable radio communication device in response to identifying the identified channel from one of the primary channel and the secondary channel.

7. The method of claim 1, wherein the detected gesture is one of a plurality of gestures associated with the portable radio communication device, and further wherein each of the plurality of gestures associated with the portable radio communication device is pre-assigned to one of the primary and the secondary channel.

8. The method of claim 1, further comprising:
updating a display of the portable radio communication device to indicate status, channel information, talk-group identification (ID) associated with the identified channel.

9. A portable radio communication device comprising:
a dual-watch receiver for simultaneously receiving and processing communications on a primary channel and a secondary channel during a dual-watch mode of operation;
a gesture detection unit for detecting a gesture of the portable radio communication device, wherein the gesture detection unit comprises an accelerometer that detects one or more of:
an orientation of the portable radio communication device;
a direction of the orientation of the portable radio communication device; and
a direction of motion of the portable radio communication device;
a user interface having controls, the user interface configured to control one or more operational parameters pertaining to the primary channel and the secondary channel; and
a processor coupled to the gesture detection unit and the user interface, the processor automatically identifying a channel corresponding to the detected gesture from one of the primary channel and the secondary channel, and associating controls of the user interface to the identified channel for controlling one or more operational parameters pertaining to communications received over the identified channel during the dual-watch mode of operation;
the dual-watch receiver continuing to simultaneously receive and process communications on both channels during the dual-watch mode of operation, while the processor controls the operational parameters of the received communications over the identified channel.

10. The portable radio communication device of claim 9, wherein when the identified channel is the primary channel and when the controls of the user interface are associated with the secondary channel, the processor changes the focus of the controls of the user interface from operational parameters of the secondary channel to the operational parameters of the primary channel; and when the identified channel is the secondary channel and when the controls of the user interface are associated with the primary channel, the processor changes the focus of the controls of the user interface from operational parameters of the primary channel to the operational parameters of the secondary channel.

11. The portable radio communication device of claim 9, wherein the one user interface receives an input at the controls of the at least one user interface by a user of the portable radio communication device in response to the association, and wherein the processor controls one or more operational parameters pertaining to the identified channel during the dual-watch mode of operation in accordance with the received input.

12. The portable radio communication device of claim 9, wherein the gesture detection unit detects whether the gesture is of one of a first gesture and a second gesture:
when the detected gesture is the first gesture:
the processor identifies the channel as the primary channel and associates controls of the one user interface to the primary channel for controlling one or more operational parameters pertaining to the primary channel during the dual-watch mode of operation; and
when the detected gesture is the first gesture:
the processor identifies the channel as the secondary channel and associates controls of the user interface to the secondary channel for controlling one or more operational parameters pertaining to the secondary channel during the dual-watch mode of operation.

13. The portable radio communication device of claim 9, wherein the user interface comprises one or more of a volume adjustment and an encryption on/off interface, and wherein the one or more operational parameters of the identified channel comprise one or more of a volume parameter and an encryption on/off parameter pertaining to the identified channel and wherein the processor performs one or more of:
associating controls of the volume adjustment interface to the identified channel for controlling volume of communications over the identified channel; and
associating controls of the encryption on/off interface to the identified channel for enabling/disabling encryption over the identified channel.

14. The portable radio communication device of claim 9, wherein the gesture detection unit is activated based on a user input.

15. The portable radio communication device of claim 9, wherein the portable radio communication device comprises one of:
a two-way radio; and
a remote speaker microphone 'RSM' accessory communicatively coupled to a two-way radio.

16. The portable radio communication device of claim 9, wherein the portable communication device comprises a two-way radio operatively coupled to a collaborative accessory device and gestures of the collaborative accessory device identify the channel for dual-watch mode of operation of the two-way radio.

17. The portable radio communication device of claim 9, further comprising a display for indicating status, channel information, talk-group identification (ID), signal strength indication, channel frequency, and encryption on/off associated with the identified channel.

18. The method of claim 1, the method further comprising detecting the gesture at a collaborative accessory device operatively coupled to the portable radio communication device, the detected gesture at the collaborative accessory device identifying the channel for dual-watch mode of operation of the two-way radio.

19. The method of claim 1, wherein during the dual-watch mode of operation, a display is configured to indicate communications of which channel out of the primary channel and the secondary channel is being played at one or more speakers on the portable radio communication device.

* * * * *